(12) United States Patent
Sim

(10) Patent No.: US 12,374,961 B2
(45) Date of Patent: Jul. 29, 2025

(54) WIND POWER GENERATION SYSTEM INCLUDING SEMICONDUCTOR TRANSFORMER MODULE AND CONTROL METHOD THEREFOR

(71) Applicant: LS ELECTRIC CO., LTD., Anyang-si (KR)

(72) Inventor: Jung Wook Sim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 18/288,514

(22) PCT Filed: Mar. 14, 2022

(86) PCT No.: PCT/KR2022/003543
§ 371 (c)(1),
(2) Date: Oct. 26, 2023

(87) PCT Pub. No.: WO2022/231125
PCT Pub. Date: Nov. 3, 2022

(65) Prior Publication Data
US 2024/0213851 A1     Jun. 27, 2024

(30) Foreign Application Priority Data
Apr. 30, 2021  (KR) .......................... 10-2021-0056215

(51) Int. Cl.
*H02K 7/18* (2006.01)
*F03D 9/25* (2016.01)
(Continued)

(52) U.S. Cl.
CPC ........... *H02K 7/1838* (2013.01); *H01F 27/24* (2013.01); *H01F 27/2823* (2013.01); *F03D 9/25* (2016.05)

(58) Field of Classification Search
CPC ... H02K 7/1838; H01F 27/24; H01F 27/2823; H01F 27/28; H01F 38/26; F03D 9/25;
(Continued)

(56) References Cited

U.S. PATENT DOCUMENTS

2012/0146335 A1\* 6/2012 Bywaters ................ F03D 80/82
290/55
2021/0136944 A1\* 5/2021 Lan .......................... H01F 27/24

FOREIGN PATENT DOCUMENTS

JP        2016220482 A    12/2016
KR    20110137262 A    12/2011
(Continued)

OTHER PUBLICATIONS

Office Action for related Korean Application No. 10-2021-0056215; action dated Nov. 16, 2023; (6 pages).
(Continued)

*Primary Examiner* — Joseph Ortega
(74) *Attorney, Agent, or Firm* — K&L Gates LLP

(57) ABSTRACT

Disclosed are a wind power generation system including a semiconductor transformer module in which a power conversion device and a transformer are integrally formed, and a control method therefor, and more particularly, a wind power generation system including a semiconductor transformer module and a control method therefor, the system including a rotating unit that is rotatable by wind power and a nacelle coupled to one side of the rotating unit, wherein the nacelle includes a generator and a semiconductor transformer module for converting input power of the generator into power of a higher voltage.

10 Claims, 8 Drawing Sheets

(51) Int. Cl.
*H01F 27/24* (2006.01)
*H01F 27/28* (2006.01)

(58) Field of Classification Search
CPC ........ F03D 9/255; F03D 80/821; F03D 80/82;
F03D 7/0284; F03D 7/042; Y02E 10/72;
Y02E 10/76; F05B 2240/221
See application file for complete search history.

(56) References Cited

FOREIGN PATENT DOCUMENTS

| KR | 101224625 | B1 | 1/2013 | | |
|---|---|---|---|---|---|
| KR | 101463388 | B1 | 11/2014 | | |
| KR | 20150137132 | | * | 9/2015 | .............. F03D 11/00 |
| KR | 20150137132 | A | | 12/2015 | |
| KR | 200489237 | Y1 | | 8/2019 | |
| KR | 20190098497 | A | | 8/2019 | |
| KR | 20200066441 | A | | 6/2020 | |
| KR | 102182539 | B1 | | 11/2020 | |
| WO | 2021041465 | A1 | | 3/2021 | |

OTHER PUBLICATIONS

International Search Report for related International Application No. PCT/KR2022/003543; action dated Nov. 3, 2022; (3 pages).
Written Opinion for related International Application No. PCT/KR2022/003543; action dated Nov. 3, 2022; (6 pages).

* cited by examiner

WIND POWER GENERATION SYSTEM INCLUDING SEMICONDUCTOR TRANSFORMER MODULE AND CONTROL METHOD THEREFOR

CROSS-REFERENCE TO RELATED APPLICATION

This application is a National Stage of International Application No. PCT/KR2022/003543, filed on Mar. 14, 2022, which claims priority to and the benefit of Korean Patent Application No. 10-2021-0056215, filed on Apr. 30, 2021, the disclosures of which is incorporated herein by reference in its entirety.

FIELD

The present disclosure relates to a wind power generation system including a semiconductor transformer module and a control method therefor, and more specifically to a wind power generation system including a semiconductor transformer module in which a power conversion device and a transformer are integrally formed, and a control method therefor.

BACKGROUND

The wind power generation system refers to a power generation system that converts wind energy into electrical energy. Specifically, the electric energy is produced by the rotational force of blades that are rotated by the wind.

The wind power generation system is provided with a generator and a power conversion device. The generator converts the rotational energy of blades into electrical energy. The power produced by the generator is converted into a predetermined output power by the power conversion device.

In order for the wind power system to supply more power, the capacity of the wind power system needs to be further increased. In this case, the voltage that is output from the generator cannot be greatly increased for reasons such as insulation and the like, and is maintained constant. Accordingly, an increase in the capacity of the wind power generation system can be achieved by an increase in the current.

Since the magnitude of the current is proportional to the diameter of the power cable, an increase in the volume and weight of the power cable is usually accompanied when the current is increased. However, when the volume and weight of the power cable are excessively increased, there may be restrictions in the overall design of the wind power generation system.

As a method for reducing the diameter of the power cable, a wind power generation system in which the power conversion device is installed in a nacelle located at the top of the tower may be considered. However, this entails increases in the volume and weight of the nacelle, and also causes an increase in the weight of the tower supporting the nacelle. As a result, there is a possibility that it will be adversely affected in terms of the design of the wind power generation system.

Accordingly, the development of a power conversion device that is capable of reducing the volume and weight compared to the same capacity can be considered.

Korean Registered Utility Model Publication No. 20-0489237 discloses a transformer for a wind power generator. Specifically, it discloses a transformer for a wind power generator that is seated inside the tower column.

However, this type of transformer is provided at the lower portion of the wind power generator, and when the capacity of the wind generator increases, the volume and weight of the power cable are also increased. Accordingly, restrictions may arise in the design of the wind power generator.

Korean Registered Patent Publication No. 10-1364243 discloses a power conversion device for a wind power generator. Specifically, the power conversion device including a first converter, a DC link, a second converter and a converter control unit is disclosed.

However, in this type of power conversion device, there is a possibility that the volume and weight of the entire wind power generator may be increased due to an increase in the volume and weight of the nacelle. This can be detrimental in terms of the design of the wind generator.

(Patent Document 1) Korean Registered Utility Model Publication No. 20-0489237 (Aug. 29, 2019)
(Patent Document 2) Korean Registered Patent Publication No. 10-1364243 (Feb. 17, 2014)

SUMMARY

An object of the present disclosure is to provide a wind power generation system including a semiconductor transformer module that is formed in a smaller volume and weight than a conventional transformer of the same capacity, and a control method therefor.

Another object of the present disclosure is to provide a wind power generation system including a semiconductor transformer module that can be arranged in various forms according to a target voltage, a target capacity and an installation space, and a control method therefor.

Still another object of the present disclosure is to provide a wind power generation system including a semiconductor transformer module that can be operated with optimum conversion efficiency according to the production power of the generator, and a control method therefor.

Still another object of the present disclosure is to provide a wind power generation system including a semiconductor transformer module that can be easily applied even to difficult-to-access facilities, and a control method therefor.

Still another object of the present disclosure is to provide a wind power generation system including a semiconductor transformer module in which the rotation restrictions of a nacelle due to a power cable can be alleviated, and a control method therefor.

In order to achieve the above objects, the wind power system according to an exemplary embodiment of the present disclosure includes a rotating unit which can be rotated in a predetermined direction by wind power; and a nacelle which is coupled to one side of the rotating unit, wherein the nacelle includes a generator which is coupled to a rotating shaft of the rotating unit to convert rotational energy of the rotating unit into electrical energy; and a semiconductor transformer module which is electrically connected to the generator and receives input power from the generator and converts the same into preset output power.

In addition, the output power may be formed in a higher voltage than the voltage of the input power.

In addition, a plurality of semiconductor transformer module may be provided, and the nacelle may further include an enclosure in which a space for accommodating the plurality of semiconductor transformer modules is formed.

In addition, the plurality of semiconductor transformer modules may be arranged side by side along a transverse direction or longitudinal direction.

In addition, the plurality of semiconductor transformer modules may be arranged in a matrix form such that the center of gravity of the nacelle can correspond to a preset position.

In addition, the plurality of semiconductor transformer modules may be disposed in any one of series and parallel, or a mixture of series and parallel, such that the output results correspond to a preset output voltage and the output power.

In addition, a plurality of enclosures may be provided, and the plurality of enclosures may be arranged in a matrix form such that the center of gravity of the nacelle can correspond to a preset position.

In addition, the enclosure may be made of a plurality of parts that can be disassembled or combined with each other, and the plurality of parts may be assembled and manufactured.

In addition, the semiconductor transformer module may be provided with a winding that is formed of a stranded wire.

In addition, the winding may be formed of a litz wire.

In addition, the semiconductor transformer module may be provided with an iron core that is formed of a ferrite or nano-crystal material.

In addition, one side of the nacelle may be coupled to a tower extending in a direction toward the ground, and the rotating unit and the nacelle can be rotated around the tower according to a change in external wind direction.

In addition, the present disclosure discloses a method for controlling a wind power system, including the steps of (a) starting the rotating operation of the rotating unit by wind power; (b) transferring rotational energy of the rotating unit to the generator; (c) producing electrical energy by the generator; and (d) converting, by the semiconductor transformer module, production power of the generator into power of a higher voltage.

In addition, prior to step (a), step (a0) of rotating the rotating unit and the nacelle around the tower in response to a change in external wind direction may be performed.

In addition, step (d) may include the step of (d1) adjusting the number of operating semiconductor transformer modules according to a change in the production power.

Further, in step (d1), the number of operating semiconductor transformer modules may be adjusted to a number that maximizes power conversion efficiency.

In addition, step (d) may include the step of (d2) converting, by the semiconductor transformer module, the production power to a frequency higher than 60 Hz.

In addition, after step (d2), step (d3) of outputting, by the semiconductor transfer module, power that is converted in the form of a preset voltage and current may be performed.

Among the various effects of the present disclosure, effects that can be obtained through the above-described technical solution are as follows.

First of all, the production power of the generator is converted by the semiconductor transformer module and transmitted to the electrical system. The semiconductor transformer module is formed by integrating an existing power conversion device and a transformer.

The semiconductor transformer module converts the production power into a square wave of a higher frequency. In addition, the winding of the semiconductor transformer module is formed in a stranded wire structure, and the iron core is formed of a ferrite or nano-crystal material, which is lighter than a silicon steel sheet.

Accordingly, the semiconductor transformer module may be formed with a smaller volume and weight than a conventional transformer of the same capacity.

In addition, a plurality of semiconductor transformer modules may be provided. The plurality of semiconductor transformer modules may be arranged in a matrix form. Furthermore, the plurality of semiconductor transformer modules may be freely arranged in series or parallel.

Accordingly, the semiconductor transformer module which is capable of responding to various target voltages and capacities may be designed. Furthermore, the nacelle in which a semiconductor transformer module is embedded may be designed and installed more easily. These may be advantageously applied to a power generation system installed in a limited space, such as a wind power generation system.

In addition, when the generated power of the generator changes, the number of semiconductor transformer modules that are operated may be adjusted in response to the change.

Accordingly, the semiconductor transformer module may be driven in the optimum conversion efficiency section according to the power generated by the generator. As a result, the power generation efficiency of the wind power generation system may be further improved.

In addition, the enclosure of the semiconductor transformer module may be made of a plurality of parts that can be disassembled or integrated with respect to each other. In addition, the semiconductor transformer module may be formed in the form of a small and light module.

Accordingly, the semiconductor transformer module and the enclosure may be more easily transported into the interior of the nacelle. Accordingly, the ratio of using heavy equipment during installation and maintenance of the semiconductor transformer module may be further reduced. As a result, the semiconductor transformer module may be easily applied to difficult-to-access facilities such as mountains or sea.

In addition, the diameter of the power cable for transferring power from the semiconductor transformer module to the electrical system may be reduced, and at the same time, the volume and weight of the nacelle may be reduced.

Accordingly, the rotation restriction of the nacelle due to the power cable may be more relaxed. That is, the maximum rotation angle of the power cable may be further increased.

DETAILED DESCRIPTION

Figure 1:
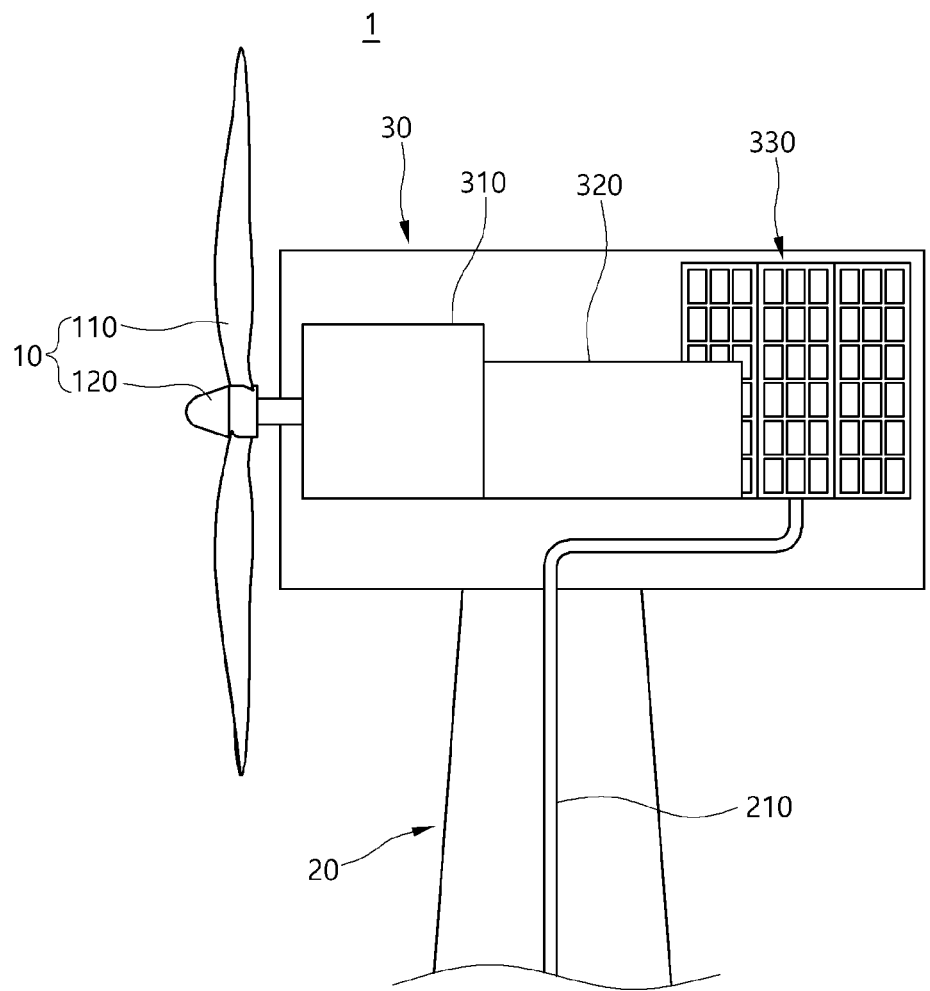
FIG. 1 is a schematic diagram illustrating a wind power generation system according to an exemplary embodiment of the present disclosure.

Hereinafter, the wind power generation system 1 and a control method therefor according to an exemplary embodiment of the present disclosure will be described in more detail with reference to the drawings.

In the following description, in order to clarify the characteristics of the present disclosure, the descriptions of some components may be omitted.

In the present specification, the same reference numerals are assigned to the same components even in different exemplary embodiments, and the overlapping descriptions thereof will be omitted.

The accompanying drawings are only provided for making it easy to understand the exemplary embodiments disclosed in the present specification, and the technical ideas disclosed in the present specification are not limited by the accompanying drawings.

The singular expression includes the plural expression, unless the context clearly dictates otherwise.

Hereinafter, the wind power generation system 1 according to an exemplary embodiment of the present disclosure will be described with reference to FIG. 1.

The wind power generation system 1 is a power generation system that produces electric energy from external wind power. Specifically, the wind power generation system 1 converts rotational energy into electrical energy, thereby producing electrical energy.

The wind power generation system 1 may be installed both on land or offshore. However, the wind power generation system 1 is typically installed in a windy area. This is because the amount of power generated by the power generation system is proportional to the cube of the wind strength.

Electrical energy produced in the wind power generation system 1 is delivered to an electrical system. The electrical energy that reaches the electrical system is finally supplied to various places requiring electrical energy, such as homes, institutions, businesses and the like.

In the illustrated exemplary embodiment, the wind power generation system 1 includes a rotating unit 10, a tower 20 and a nacelle 30.

The rotating unit 10 transfers wind energy from the outside of the wind power generation system 1 to the nacelle 30 to be described below.

The rotating unit 10 is located on the upper side of the wind power generation system 1. This is because the strength of the wind becomes stronger as it rises higher from the earth's surface.

When the wind passes through the rotating unit 10, the rotating unit 10 is rotated in a predetermined direction and has rotational energy.

In the illustrated exemplary embodiment, the rotating unit 10 includes a blade 110 and a hub 120.

The blade 110 is a portion in which the rotating unit 10 is in direct contact with the wind.

The blade 110 is formed in a plate shape extending radially outward. In this case, the blade 110 is curved and extended in one direction. In addition, a plurality of blades 110 may be provided.

When wind passes through the blade 110, the blade 110 is rotated in a predetermined direction. The predetermined direction is related to the curved direction of the blade 110.

That is, the direction of rotation of the blade 110 is determined according to the curved direction thereof.

The hub 120 is disposed at the center of the blade 110.

The hub 120 functions as a rotation shaft of the blade 110. That is, the blade 110 is rotated based on the hub 120.

The hub 120 is positioned radially inside the blade 110. That is, the plurality of blades 110 are coupled to the radially outer side of the hub 120. In other words, the hub 120 is disposed to be surrounded by the plurality of blades 110.

In an exemplary embodiment, the hub 120 is formed in a pillar shape extending in one direction. The one direction is a direction perpendicular to the extending direction of the blade 110.

The hub 120 rotates together with the blade 110 when the blade 110 rotates. Specifically, when the blade 110 is rotated clockwise or counterclockwise, the hub 120 is also rotated clockwise or counterclockwise together with the blade 110.

The tower 20 is disposed below the rotating unit 10.

The tower 20 separates the rotating unit 10 from the ground such that the rotating unit 10 can be in contact with the wind from the upper side. In addition, the nacelle 30, which will be described below, is supported from the lower side.

The tower 20 is formed in a columnar shape extending in a direction away from the ground from the ground of the rotating unit 10.

In an exemplary embodiment, the tower 20 is formed in a cylindrical shape extending in the vertical direction. In the exemplary embodiment, the tower 20 extends upwardly with a reduced diameter. This is for the tower 20 to more stably support the wind power generation system 1.

The tower 20 may be formed of a high-strength material. For example, the tower 20 may be formed of a concrete material.

In the illustrated exemplary embodiment, a power cable 210 is built inside the tower 20.

The power cable 210 transfers the electrical energy produced in the wind power generation system 1 to an external electrical system.

The power cable 210 is disposed between the nacelle 30 and an external electric system to be described below, so as to be electrically connected to the nacelle 30 and the external electric system, respectively. The detailed description thereof will be described below together with the nacelle 30.

The power cable 210 passes through the interior space of the tower 20. Accordingly, the power cable 210 extends in the same direction as the extension direction of the tower 20.

The power cable 210 has an inner side that is formed of a conductor material and an outer side that is formed of an insulator material. In an exemplary embodiment, the power cable 210 is formed of a metal material on the inside and a synthetic rubber resin material on the outside.

The nacelle 30 is installed above the tower 20.

Figure 2:
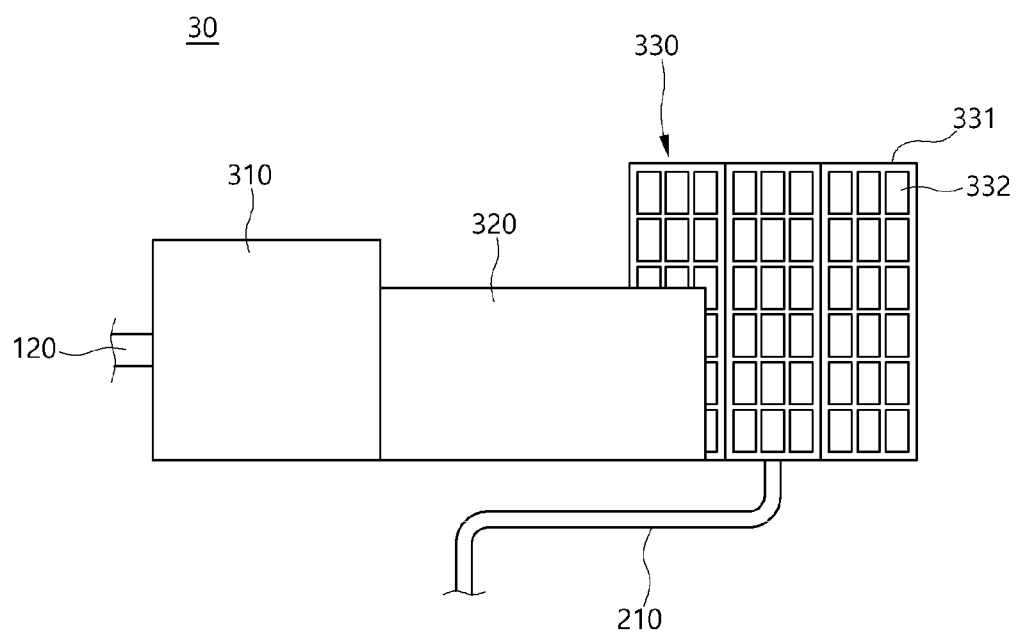
FIG. 2 is a schematic diagram illustrating a nacelle provided in the wind power generation system of FIG. 1.

Hereinafter, the nacelle 30 will be described with reference to FIG. 2.

The nacelle 30 is a portion that converts the rotational energy of the rotating unit 10 into electrical energy.

The nacelle 30 is coupled to one side of the rotating unit 10. Specifically, the nacelle 30 is coupled to the hub 120 of the rotating unit 10.

The upper end of the tower 20 is coupled to the lower side of the nacelle 30. Accordingly, the nacelle 30 may be supported by the tower 20 and spaced apart from the ground.

In addition, the nacelle 30 is electrically connected to the power cable 210. Power which is output from the nacelle 30 is supplied to an external electrical system through the power cable 210.

The nacelle 30 may be rotated around the tower 20 together with the rotating unit 10. Specifically, the nacelle 30 and the rotating unit 10 may detect a change in the wind direction and rotate based thereon.

In the illustrated exemplary embodiment, the nacelle 30 includes a gear box 310, a generator 320 and a power conversion unit 330.

The gear box 310 receives the rotational energy of the rotating unit 10 and rotates a rotor of the generator 320 at a preset speed. That is, the gear box 310 adjusts the rotation speed of the rotor of the generator 320.

The gear box 310 is disposed between the hub 120 and the generator 320 of the rotating unit 10, so as to be coupled to the hub 120 and the generator 320, respectively.

When an excessive wind speed is generated by a typhoon or the like, there is a possibility that the rotor of the generator 320 rotates at an excessive speed. Excessive rotation of the rotor may cause damage to the generator 320. Accordingly, the gear box 310 adjusts the rotation speed of the rotor such that the rotor does not rotate excessively.

However, the gear box 310 may be omitted because it does not correspond to an essential component. That is, the hub 120 may be directly coupled to the generator 320 without passing through the gear box 310.

The generator 320 converts the rotational energy of the rotating unit 10 into electrical energy.

The generator 320 is coupled to the hub 120 and the gear box 310 of the rotating unit 10, so as to receive rotational energy from the hub 120 and the gear box 310.

The generator 320 is provided with a hub 120 and a rotor that is coupled to the gearbox. The rotor is coupled to the hub 120 and rotates together with the hub 120 when the hub 120 rotates. In an exemplary embodiment, the rotation speed of the rotor may be adjusted by the gear box 310.

The generator 320 generates electrical energy by using the rotational force of the rotor.

Power generated by the generator 320 is transferred to the power conversion unit 330.

Hereinafter, the power conversion unit 330 will be described with reference to FIGS. 3 to 6.

The power conversion unit 330 converts the generated power of the generator 320 into preset output power. In this case, the output power is made of a voltage higher than the voltage of the production power of the generator 320.

The power conversion unit 330 is disposed between the generator 320 and the power cable 210, so as to be electrically connected to the generator 320 and the power cable 210, respectively.

In the illustrated exemplary embodiment, the power conversion unit 330 includes an enclosure 331 and a semiconductor transformer module 332.

The enclosure 331 forms the exterior of the power conversion unit 330.

A space in which various components can be accommodated is formed inside the enclosure 331.

In the illustrated exemplary embodiment, the enclosure 331 is formed in a rectangular parallelepiped shape. However, the enclosure 331 is not limited to the illustrated shape, and it may be formed in various shapes. For example, the enclosure 331 may be formed in a cylindrical shape.

A plurality of enclosures 331 may be provided. The plurality of enclosures 331 may be arranged side by side in the transverse direction or the longitudinal direction.

In addition, the plurality of enclosures 331 may be arranged in a matrix form such that the center of gravity of the nacelle 30 coincides with a preset position.

In an exemplary embodiment, the enclosure 331 consists of a plurality of parts that can be disassembled or combined with each other. In the exemplary embodiment, the enclosure 331 is manufactured by assembling the plurality of parts.

In the illustrated exemplary embodiment, the enclosure 331 includes a door 331a and a module box 331b.

The door 331a is formed on one side of the enclosure 331.

The door 331a is formed in a plate shape. In addition, at least one corner of the door 331a may be fixed with respect to the enclosure 331, and it may be rotated with respect to the enclosure 331. As the door 331a is rotated, the inner space of the enclosure 331 may be opened and closed.

A single or a plurality of module boxes 331b are formed in the inner space of the enclosure 331.

The module box 331b is a space into which the semiconductor transformer module 332 to be described below is inserted. Accordingly, the module box 331b is formed in a shape corresponding to the semiconductor transformer module 332.

The semiconductor transformer module 332 receives input power from the generator 320, converts the same into preset output power, and transmits the same to the power cable 210.

The semiconductor transformer module 332 is formed by integrating a conventional power conversion device and a transformer. Accordingly, the semiconductor transformer module 332 may be formed to have a smaller volume and weight than a conventional transformer having the same capacity.

The winding of the semiconductor transformer module 332 is formed of a stranded wire composed of very thin wires. In an exemplary embodiment, the winding is formed of a litz wire. Accordingly, the skin effect due to the high-frequency current may be prevented.

In an exemplary embodiment, the iron core provided in the semiconductor transformer module 332 may be formed of a material having excellent durability against high-frequency current. For example, the iron core may be formed of a ferrite or nano-crystal material. In particular, in the case of ferrite and nanocrystal, it is advantageous in terms of mass compared to a silicon steel sheet, which is a conventional iron core material.

In summary, the semiconductor transformer module 332 according to an exemplary embodiment of the present disclosure may be formed to have a smaller volume and weight than a conventional transformer having the same capacity.

Accordingly, the semiconductor transformer module 332 may be more easily transported into the nacelle 30. Accordingly, the ratio of using heavy equipment during installation and maintenance of the semiconductor transformer module 332 may be further reduced. As a result, the semiconductor transformer module 332 may be easily applied to facilities that are difficult to access, such as mountains or sea.

In addition, the diameter of the power cable 210 that transmits power from the semiconductor transformer module 332 to the system may be reduced, and the volume and weight of the nacelle 30 may be reduced at the same time. Accordingly, rotation restrictions of the nacelle 30 due to the power cable 210 may be more relaxed. That is, the maximum rotation angle of the power cable 210 may be further increased.

As described above, the semiconductor transformer module 332 receives input power from the generator 320, converts the same into preset output power, and transmits the same to the power cable 210. To this end, the semiconductor transformer module 332 is electrically connected to the generator 320 and the power cable 210, respectively. A voltage of the output power is greater than a voltage of the input power. The conversion process is as follows.

First of all, the semiconductor transformer module 332 converts a sine wave of a low frequency into a square wave of a high frequency. When electric power is converted to a high frequency, the voltage is transformed to a high voltage. The transformed power is finally converted back to a low frequency and output. Herein, the high frequency means a frequency higher than the commercial frequency (60 Hz).

A plurality of semiconductor transformer modules 332 may be provided. In this case, the plurality of semiconductor transformer modules 332 may be arranged in a matrix form. In an exemplary embodiment, the plurality of semiconductor transformer modules 332 may be arranged such that the center of gravity of the nacelle 30 coincides with a preset position.

Figure 3:
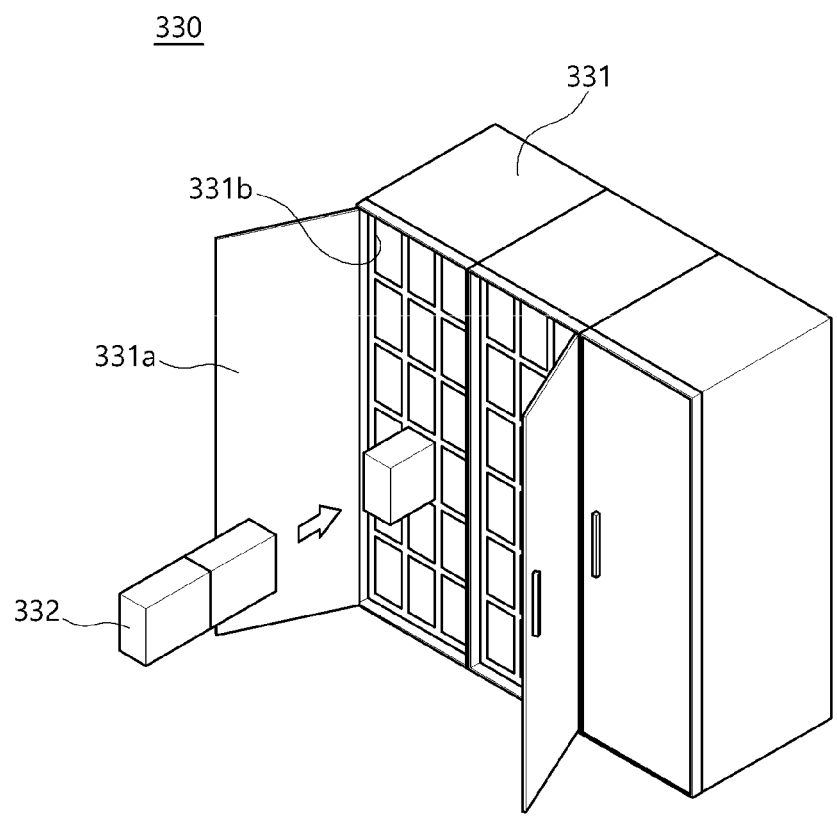
FIG. 3 is a perspective view illustrating a power conversion unit according to an exemplary embodiment of the present disclosure.
Figure 4:
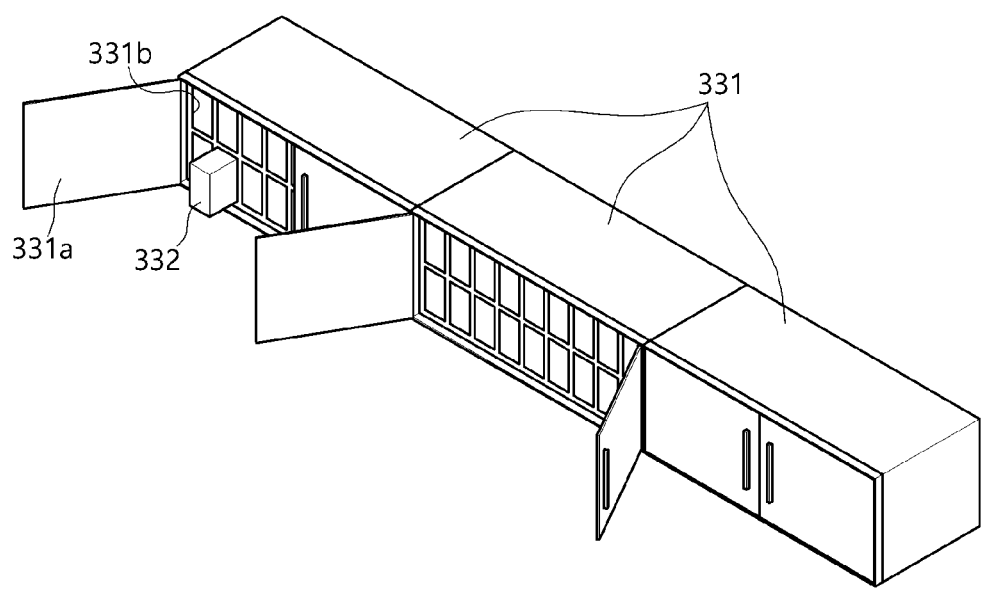
FIG. 4 is a perspective view illustrating a power conversion unit according to another exemplary embodiment of the present disclosure.
Figure 5:
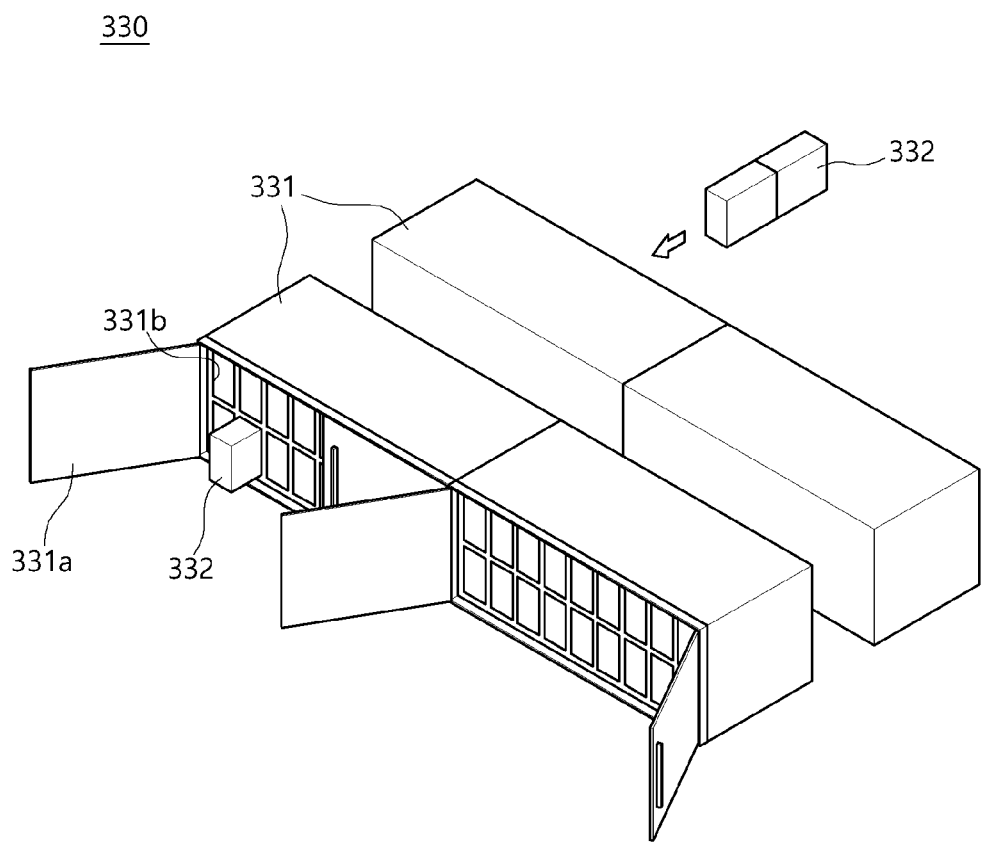
FIG. 5 is a perspective view illustrating a power conversion unit according to another exemplary embodiment of the present disclosure.

FIGS. 3 to 5 show various exemplary embodiments of the arrangement structure of the semiconductor transformer module 332.

The plurality of semiconductor transformer modules 332 may be arranged side by side in the transverse direction or longitudinal direction. In an exemplary embodiment, the plurality of semiconductor transformer modules 332 may be arranged in any one of series and parallel, or a mixture of series and parallel, such that the output results correspond to a preset output voltage and output power.

Accordingly, the semiconductor transformer module 332 which is capable of responding to various target voltages and capacities may be designed. Furthermore, the nacelle 30 in which the semiconductor transformer module 332 is embedded may be designed and installed more easily. This can be advantageously applied to a power generation system installed in a limited space, such as the wind power generation system 1.

Figure 6:
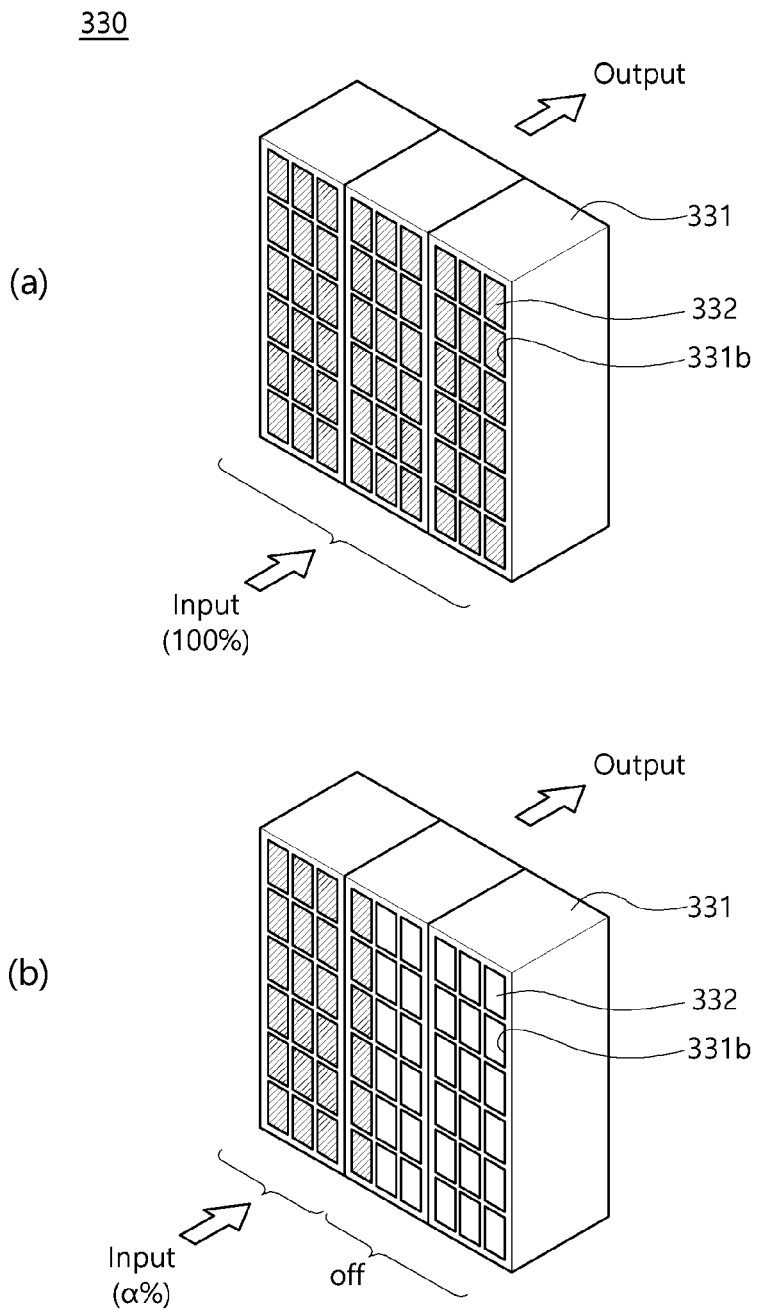
FIG. 6 is a perspective view illustrating a power conversion unit in a state before and after the number of operating semiconductor transformer modules is adjusted.

In addition, the number of operation of the semiconductor transformer modules 332 may be adjusted. Specifically, when the production power of the generator 320 is changed, the number of the operating semiconductor transformer modules 332 may be adjusted in response to the change. FIGS. 6(*a*) and 6(*b*) illustrate the power conversion unit 330 in which the semiconductor transformer module 332 is operated at 100% and a %, respectively.

In the case of the wind power generation system 1, the range of variation of the generated power is large, and thus, the power conversion efficiency also changes according to the variation of the generated power. The power conversion unit 330 may operate the semiconductor transformer module 332 in the optimum efficiency section by adjusting the number of the operating semiconductor transformer modules 332 to the number at which the power conversion efficiency is maximized. As a result, the power generation efficiency of the wind power generation system 1 may be further improved.

Figure 7:
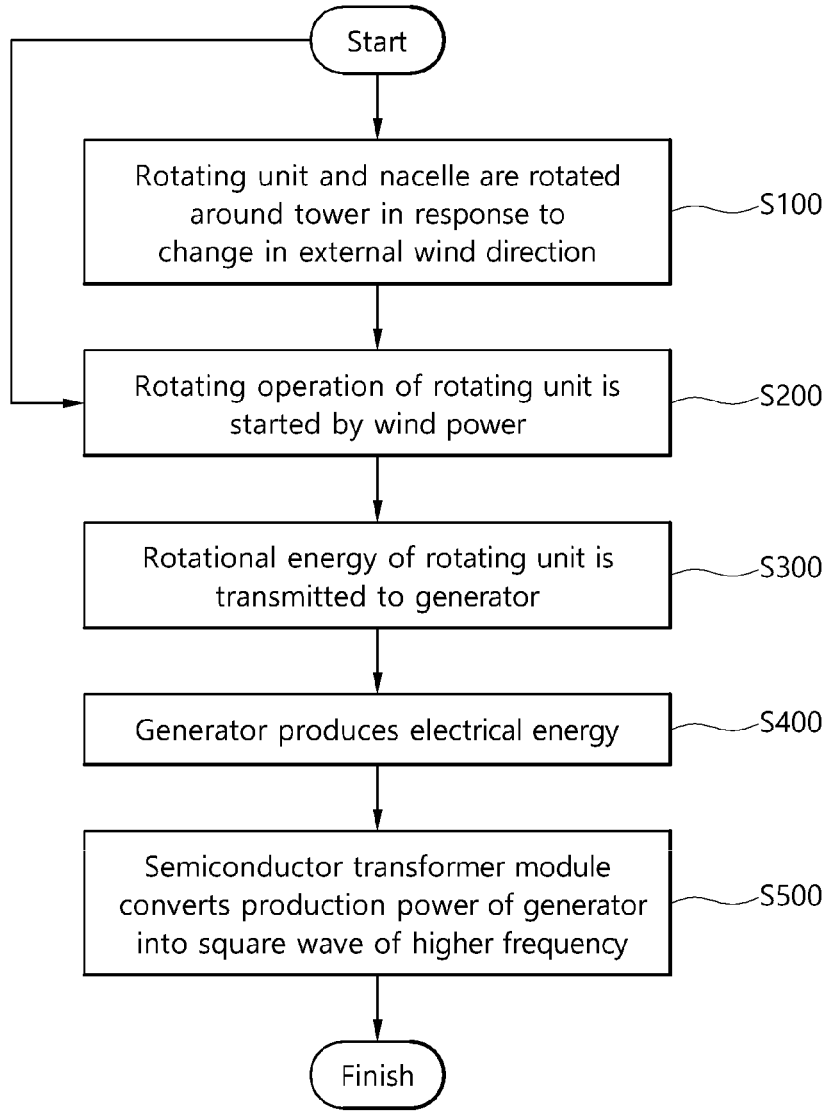
FIG. 7 is a flowchart illustrating the method for controlling a wind power generation system according to an exemplary embodiment of the present disclosure.
Figure 8:
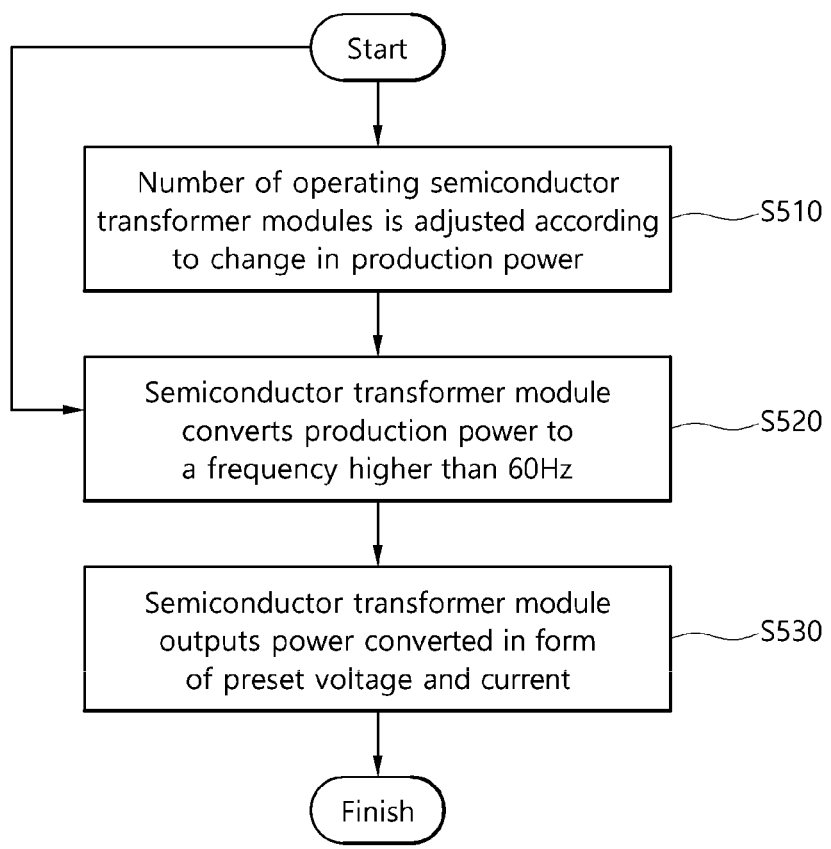
FIG. 8 is a flowchart illustrating the specific steps of step S500 in FIG. 7.

Hereinafter, the method for controlling the wind power generation system 1 will be described in more detail with reference to FIGS. 7 to 8.

The method for controlling the wind power generation system 1 according to an exemplary embodiment of the present disclosure includes the steps of rotating the rotating unit 10 and the nacelle 30 around the tower 20 in response to a change in external wind direction (S100), starting the rotating operation of the rotating unit 10 by wind power (S200), transferring rotational energy of the rotating unit 10 to the generator 320 (S300), producing electrical energy by the generator 320 (S400), and converting, by the semiconductor transformer module 332, production power of the generator 320 into power of a higher voltage (S500).

First of all, the step of rotating the rotating unit 10 and the nacelle 30 around the tower 20 in response to a change in external wind direction (S100) will be described.

Since the wind is fluid and variable, the wind direction also behaves variably. In addition, the position of the blade 110 of the rotating unit 10 that can produce the maximum rotational energy is changed according to a change in the wind direction.

Accordingly, when the current position does not match the optimal position, the blade 110 must be rotated around the tower 20 in response to a change in wind direction. To this end, the rotating unit 10 including the blade 110 and the nacelle 30 to which the rotating unit 10 is coupled are rotated around the tower 20.

However, in some exemplary embodiments the step of rotating the rotating unit 10 and the nacelle 30 around the tower 20 in response to a change in external wind direction (S100) may be omitted. That is, the method for controlling the wind power generation system 1 may proceed directly to the step of starting the rotating operation of the rotating unit 10 by wind power (S200).

When the air flows through the blade 110 of the rotating unit 10, the blade 110 is rotated in a predetermined direction. Accordingly, the rotating unit 10 provided with the blade 110 is also rotated together.

Next, the step of transferring rotational energy of the rotating unit 10 to the generator 320 (S300) and the step of producing electrical energy by the generator 320 (S400) are performed.

As the rotating unit 10 including the hub 120 is rotated, the rotor of the generator 320 which is coupled to the hub 120 is also rotated together. That is, the rotor receives rotational energy. The rotor is rotated inside the generator 320 by using the rotational energy as power. The generator 320 converts the rotational energy of the rotor into electrical energy inside.

Thereafter, the semiconductor transformer module 332 converts the generated power of the generator 320 into a square wave of a higher frequency.

Hereinafter, the step of converting, by the semiconductor transformer module 332, production power of the generator 320 into power of a higher voltage (S500) will be described.

In the illustrated exemplary embodiment, the step of converting, by the semiconductor transformer module 332, production power of the generator 320 into power of a higher voltage (S500) includes the steps of adjusting the number of operating semiconductor transformer modules 332 according to a change in production power (S510), converting, by the semiconductor transformer module 332, the production power to a frequency higher than 60 Hz (S520) and outputting, by the semiconductor transformer module 332, power that is converted in the form of a preset voltage and current (S530).

First of all, the step of adjusting the number of operating semiconductor transformer modules 332 according to a change in production power (S510) will be described.

In the wind power generation system 1, the production power of the generator 320 may be significantly changed according to various variables such as wind direction and wind speed. In this case, when the production power of the generator 320 is changed, the power conversion efficiency of the power conversion unit 330 is also changed.

In order to compensate for this, the number of the operating semiconductor transformer modules 332 may be adjusted. Specifically, the number of the operating semiconductor transformer modules 332 may be adjusted to a number that maximizes power conversion efficiency.

Accordingly, the semiconductor transformer module 332 may be driven in an optimal conversion efficiency section according to the power generated by the generator 320. As a result, the power generation efficiency of the wind power generation system 1 may be further improved.

However, in some exemplary embodiments, the step of adjusting the number of operating semiconductor transformer modules 332 according to a change in production power (S510) may be omitted. That is, the step of converting, by the semiconductor transformer module 332, production power of the generator 320 into power of a higher voltage (S500) may be performed from the step of converting, by the semiconductor transformer module 332, the production power to a frequency higher than 60 Hz (S520)

Next, the step of converting, by the semiconductor transformer module 332, the production power to a frequency higher than 60 Hz (S520) and the step of outputting, by the semiconductor transformer module 332, power that is converted in the form of a preset voltage and current (S530) will be described.

First of all, the semiconductor transformer module 332 converts a sine wave of a low frequency into a square wave of a high frequency. Thereafter, the voltage of the high-frequency power is transformed into a high voltage. The transformed power is finally converted back to a low frequency and output. As a result, the production power is converted into a preset voltage level and a current form by the semiconductor transformer module 332.

Although the above has been described with reference to the preferred exemplary embodiments of the present disclosure, the present disclosure is not limited to the configuration of the above-described exemplary embodiments.

In addition, the present disclosure may be variously modified and changed by those of ordinary skill in the art to which the present disclosure pertains without departing from the spirit and scope of the present disclosure as set forth in the claims below.

Furthermore, the exemplary embodiments may be configured by selectively combining all or part of each exemplary embodiment such that various modifications can be made.

1: Wind power system
10: Rotating unit
110: Blade
120: Hub
20: Tower
210: Power cable
30: Nacelle
310: Gear box
320: Generator
330: Power conversion unit
331: Enclosure
331*a*: Door
331*b*: Module box
332: Semiconductor transformer module

The invention claimed is:

1. A wind power system, comprising:
a rotating unit which can be rotated in a predetermined direction by wind power; and
a nacelle which is coupled to one side of the rotating unit, wherein the nacelle comprises:
   a generator which is coupled to a rotating shaft of the rotating unit to convert rotational energy of the rotating unit into electrical energy; and
   a semiconductor transformer module which is electrically connected to the generator and receives input power from the generator and converts the input power into an output power; and
wherein the semiconductor transformer module is provided with a winding that is formed of a stranded wire, and
wherein the winding is formed of a litz wire.

2. The wind power system of claim 1, wherein the output power is formed in a higher voltage than a voltage of the input power.

3. The wind power system of claim 1, wherein the semiconductor transformer module comprises a plurality of semiconductor transformer modules; and
wherein the nacelle further comprises an enclosure in which a space for accommodating the plurality of semiconductor transformer modules is formed.

4. The wind power system of claim 3, wherein the plurality of semiconductor transformer modules are arranged side by side along a transverse direction or longitudinal direction.

5. The wind power system of claim 4, wherein the plurality of semiconductor transformer modules are arranged in a matrix form.

6. The wind power system of claim 4, wherein the plurality of semiconductor transformer modules are disposed in any one of series and parallel, or a mixture of series and parallel relative to one another.

7. The wind power system of claim 3, wherein a plurality of enclosures are provided, and
wherein the plurality of enclosures are arranged in a matrix form.

8. The wind power system of claim 3, wherein the enclosure is made of a plurality of parts that can be disassembled or combined with each other, and the plurality of parts are assembled and manufactured.

9. The wind power system of claim 1, wherein the semiconductor transformer module is provided with an iron core that is formed of a ferrite or nano-crystal material; and
wherein the winding winds about the iron core.

10. A method for controlling a wind power system, which is a method for controlling the wind power system according to claim 1, the method comprising the steps of:
(a) starting a rotating operation of the rotating unit by wind power;
(b) transferring rotational energy of the rotating unit to the generator;
(c) producing electrical energy by the generator; and
(d) converting, by the semiconductor transformer module, production power of the generator into power of a higher voltage.

* * * * *